(12) United States Patent
Kiyokawa et al.

(10) Patent No.: US 12,344,233 B2
(45) Date of Patent: Jul. 1, 2025

(54) PARKING ASSISTANCE DEVICE

(71) Applicants: AISIN CORPORATION, Kariya (JP); TOYOTA JIDOSHA KABUSHIKI KAISHA, Toyota (JP)

(72) Inventors: Yusuke Kiyokawa, Kariya (JP); Norio Imai, Kariya (JP); Yuki Minase, Toyota (JP); Takuya Nakagawa, Nagoya (JP)

(73) Assignees: AISIN CORPORATION, Aichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 17/485,626

(22) Filed: Sep. 27, 2021

(65) Prior Publication Data
US 2022/0097686 A1    Mar. 31, 2022

(30) Foreign Application Priority Data

Sep. 29, 2020   (JP) .................................. 2020-163394

(51) Int. Cl.
*B60W 30/06*     (2006.01)
*B60W 10/18*     (2012.01)

(52) U.S. Cl.
CPC ............ *B60W 30/06* (2013.01); *B60W 10/18* (2013.01); *B60W 2552/00* (2020.02); *B60W 2710/18* (2013.01)

(58) Field of Classification Search
CPC .. B60W 30/06; B60W 10/18; B60W 2552/00; B60W 2710/18
See application file for complete search history.

(56) References Cited

U.S. PATENT DOCUMENTS

2018/0208245 A1*   7/2018   Mizutani ............... B60W 30/06

FOREIGN PATENT DOCUMENTS

| JP | 2015-174531 A | | 10/2015 | |
| JP | 2017019332 A | * | 1/2017 | |
| JP | 2019-131042 A | | 8/2019 | |
| WO | WO-2015136863 A1 | * | 9/2015 | ........... B62D 15/028 |

OTHER PUBLICATIONS

Reason for Refusal dated Mar. 12, 2024 in Japanese Application No. 2020-163394.

* cited by examiner

*Primary Examiner* — Vivek D Koppikar
*Assistant Examiner* — Jeffrey R Chalhoub
(74) *Attorney, Agent, or Firm* — Sughrue Mion, PLLC

(57) ABSTRACT

A parking assistance device includes a central processing unit. The central processing unit detects the size of a parking space. The central processing unit sets the size of an extra space to be secured at a minimum between a vehicle and an object around the parking space while changing that size according to the detected size of the parking space. Based on the set size of the extra space, the central processing unit provides assistance in parking the vehicle into the parking space.

7 Claims, 5 Drawing Sheets

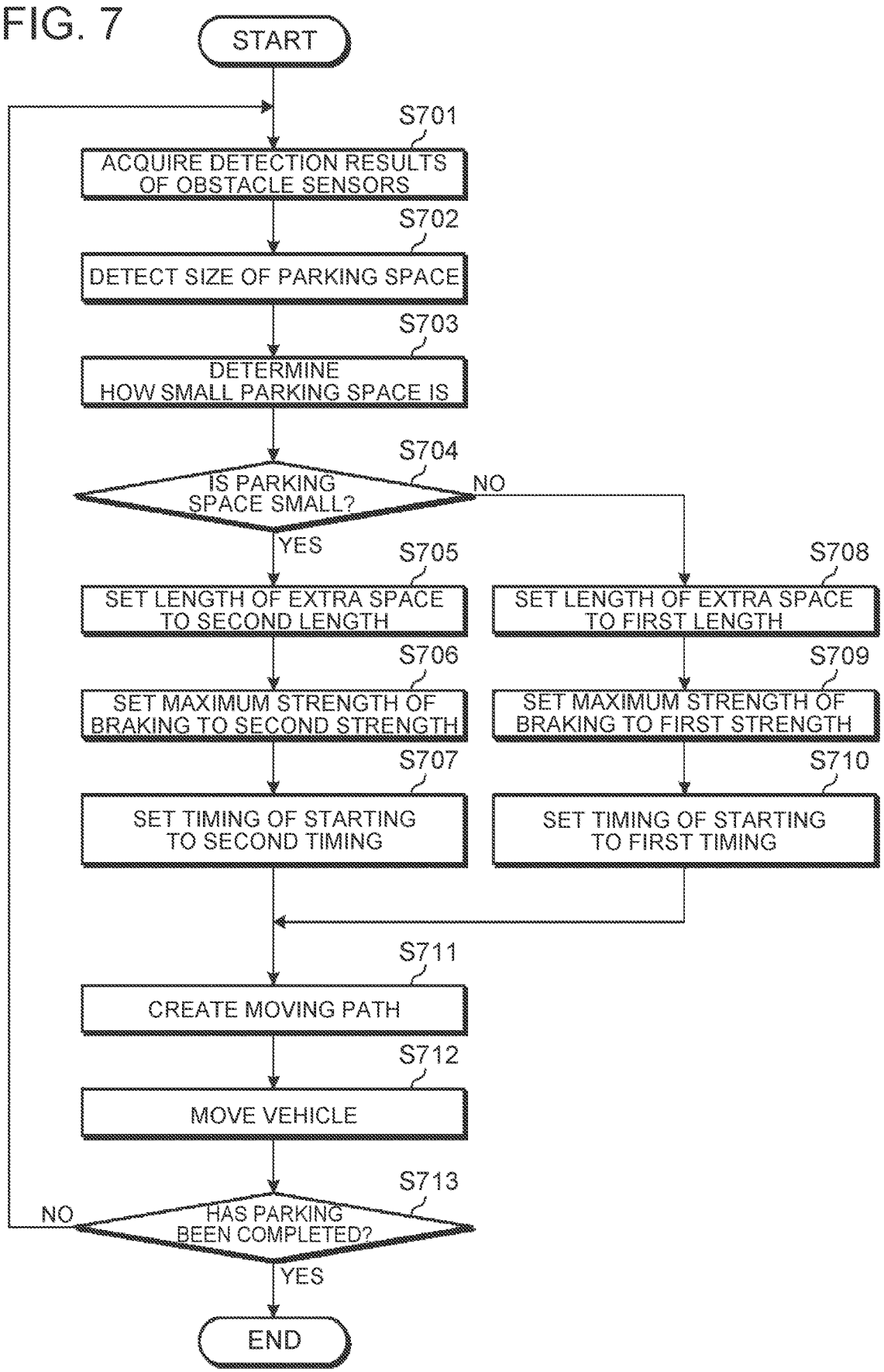

PARKING ASSISTANCE DEVICE

CROSS-REFERENCE TO RELATED APPLICATION

This application claims priority to Japanese Patent Application No. 2020-163394 filed on Sep. 29, 2020, incorporated herein by reference in its entirety.

BACKGROUND

1. Technical Field

This disclosure relates to a parking assistance device.

2. Description of Related Art

Technologies for assisting parking of a vehicle into a parking space through autonomous driving, semi-autonomous driving, etc. have been hitherto explored.

SUMMARY

To ease a sense of fear etc. caused to the driver, such technologies as mentioned above are desired to assist parking of a vehicle while securing a clearance (extra space) at a minimum between the vehicle and objects around the parking space.

However, if the size of the extra space to be secured at a minimum is always set to a fixed size, depending on the size of the parking space (and the size of the vehicle), moving the vehicle so as not to enter the extra space may become difficult to achieve and thus appropriate assistance in parking the vehicle may fail. It is therefore desirable to appropriately provide assistance in parking a vehicle while changing, as necessary, the size of the extra space to be secured at a minimum.

This disclosure provides a parking assistance device that can appropriately provide assistance in parking a vehicle while changing, as necessary, the size of the extra space to be secured at a minimum.

A parking assistance device according to an aspect of this disclosure includes a central processing unit. The central processing unit is configured to: detect a size of a parking space into which a vehicle is likely to be parked; set a size of an extra space to be secured at a minimum between the vehicle and an object around the parking space while changing that size according to the detected size of the parking space; and provide assistance in parking the vehicle into the parking space based on the set size of the extra space.

This parking assistance device can appropriately provide assistance in parking the vehicle while changing, as necessary, the size of the extra space to be secured at a minimum according to the size of the parking space.

In the above aspect, the central processing unit may be configured to set the size of the extra space to a first size when the size of the parking space is equal to or larger than a first threshold value, and to set the size of the extra space to a second size that is smaller than the first size when the size of the parking space is equal to or smaller than a second threshold value that is smaller than the first threshold value. This configuration makes it possible to easily set the size of the extra space to either the first size or the second size by comparing the size of the parking space with the first threshold value and the second threshold value.

In the above configuration, the central processing unit may be configured to repeatedly execute detection of the size of the parking space until parking of the vehicle into the parking space is completed. Further, the central processing unit may be configured to repeatedly execute setting of the size of the extra space to the first size or the second size according to the size of the parking space until parking of the vehicle into the parking space is completed. This configuration makes it possible to appropriately update the size of the extra space according to the latest detection result of the size of the parking space.

In the above configuration, the central processing unit may be configured to set the size of the extra space to one of the first size and the second size to which the size has been previously set, when the size of the parking space is between the first threshold value and the second threshold value. This configuration makes it possible to avoid frequent switching of the size of the extra space between the first size and the second size by taking a history of the previous setting into account.

In the above aspect, the central processing unit may be configured to provide assistance in parking the vehicle that includes controlling braking of the vehicle. Further, the central processing unit may be configured to set a maximum strength to be permitted of braking of the vehicle while changing the maximum strength according to the size of the parking space. This configuration makes it possible to easily move the vehicle according to the size of the parking space so as not to enter the extra space by changing the maximum strength of braking of the vehicle as necessary.

In the above configuration, the central processing unit may be configured to set the maximum strength of braking of the vehicle to a first strength when the size of the parking space is equal to or larger than a first threshold value, and to set the maximum strength of braking of the vehicle to a second strength that is higher than the first strength when the size of the parking space is equal to or smaller than a second threshold value that is smaller than the first threshold value. This configuration makes it possible to easily set the maximum strength of braking to either the first strength or the second strength by comparing the size of the parking space with the first threshold value and the second threshold value.

In the above aspect, the central processing unit may be configured to provide assistance in parking the vehicle that includes controlling a timing of starting the vehicle having been stopped. Further, the central processing unit may be configured to set the timing of starting the vehicle to be controlled while changing the timing according to the size of the parking space. This configuration makes it possible to easily move the vehicle according to the size of the parking space so as not to enter the extra space by changing the timing of starting the vehicle as necessary.

In the above configuration, the central processing unit may be configured to set the timing of starting the vehicle to a first timing when the size of the parking space is equal to or larger than a first threshold value, and to set the timing of starting the vehicle to a second timing that is later than the first timing when the size of the parking space is equal to or smaller than a second threshold value that is smaller than the first threshold value. This configuration makes it possible to easily set the timing of starting the vehicle to either the first timing or the second timing by comparing the size of the parking space with the first threshold value and the second threshold value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is an illustrative flowchart showing a sequence of processes that the parking assistance device according to the embodiment executes as the parking assistance process.

DETAILED DESCRIPTION OF EMBODIMENTS

An embodiment and modified examples of this disclosure will be described below based on the drawings. The configurations of the embodiment and the modified examples to be described below, and the workings and effects produced by these configurations are merely examples and not limited to what will be described below.

EMBODIMENT

First, the general configuration of a vehicle 1 according to the embodiment will be described using FIG. 1 and FIG. 2.

Figure 1:
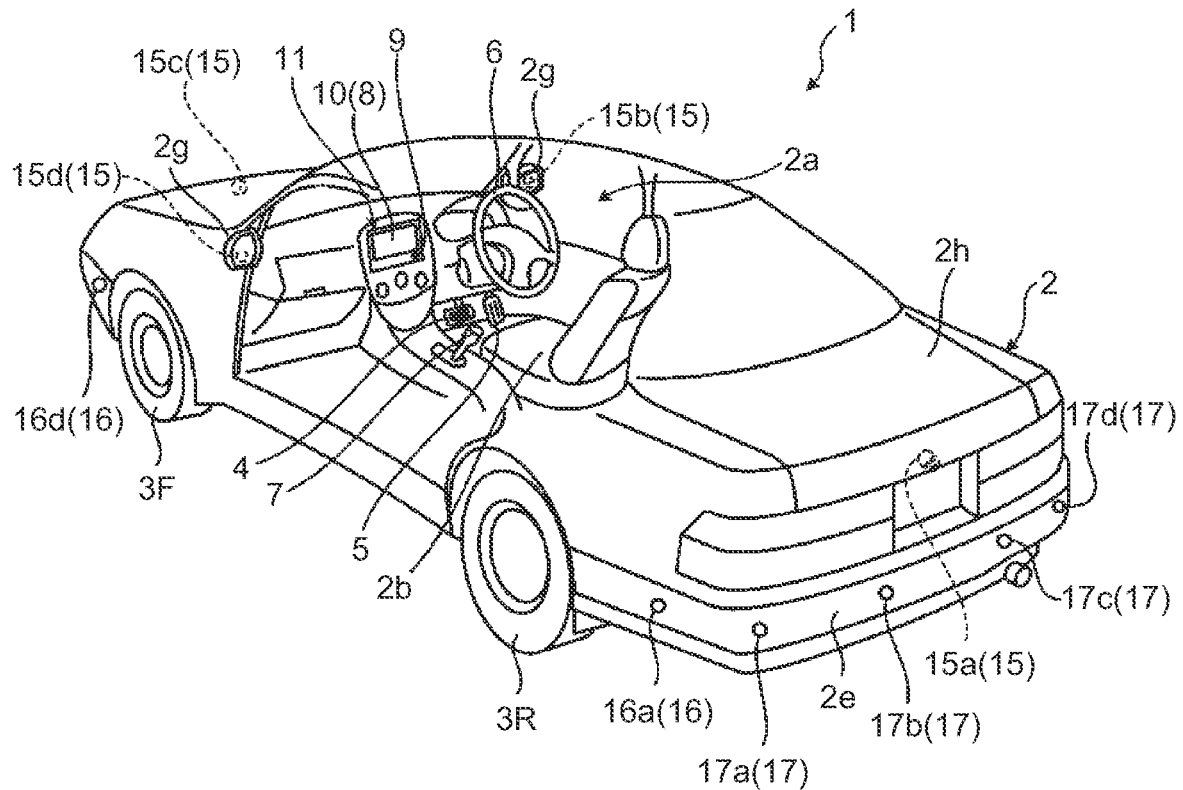
FIG. 1 is an illustrative and schematic view showing a configuration inside a vehicle cabin of a vehicle according to an embodiment.

FIG. 1 is an illustrative and schematic view showing a configuration inside a vehicle cabin 2a of the vehicle 1 according to the embodiment. FIG. 2 is an illustrative and schematic view showing an external appearance of the vehicle 1 according to the embodiment as seen from above.

As shown in FIG. 1, the vehicle 1 according to the embodiment has the vehicle cabin 2a in which occupants including a driver as a user ride. Inside the vehicle cabin 2a, a braking operation unit 4, an acceleration operation unit 5, a steering operation unit 6, a shift operation unit 7, etc. are provided in such a state that the user can operate them from a seat 2b.

The braking operation unit 4 is an operation input device that receives the driver's operation input into a braking mechanism that generates a braking force on the vehicle 1. The acceleration operation unit 5 is an operation input device that receives the driver's operation input into an acceleration mechanism that generates an acceleration force on the vehicle 1. The steering operation unit 6 is an operation input device that receives the driver's operation input into a steering mechanism that steers turning wheels of the vehicle 1. The shift operation unit 7 is an operation input device that receives the driver's operation input into a shift mechanism that switches a gear ratio of the vehicle 1.

For example, in the example shown in FIG. 1, the braking operation unit 4 is a brake pedal provided near the foot of the driver. The acceleration operation unit 5 is an accelerator pedal provided near the foot of the driver. The steering operation unit 6 is a steering wheel protruding from a dashboard (instrument panel). The shift operation unit 7 is a shift lever protruding from a center console.

Inside the vehicle cabin 2a, a monitor device 11 having a display unit 8 capable of outputting various images and a voice output unit 9 capable of outputting various sounds is provided. The monitor device 11 is provided inside the vehicle cabin 2a, for example, at a central part of the dashboard in a width direction (left-right direction). The display unit 8 is formed by, for example, a liquid crystal display (LCD) or an organic electroluminescence display (OELD).

Here, an operation input unit 10 is provided in a display screen of the display unit 8 that serves as a region in which images are displayed. The operation input unit 10 is configured as, for example, a touch panel that can detect the coordinate of a position that a pointier, such as a finger or a stylus, has approached (or contacted). Thus, the user (driver) can visually recognize images displayed on the display screen of the display unit 8, as well as can make various operation inputs by performing a touch (or tap) operation on the operation input unit 10 using the pointer.

Alternatively, in the embodiment, the operation input unit 10 may be various types of physical interfaces such as a switch, a dial, a joystick, and a push button. In the embodiment, another voice output device may be provided inside the vehicle cabin 2a, at a position different from the position of the monitor device 11. In this case, various pieces of sound information can be output from both the voice output unit 9 and that other voice output device. Further, in the embodiment, the monitor device 11 may be configured to be able to display information relating to various systems, including a navigation system and an audio system.

Figure 2:
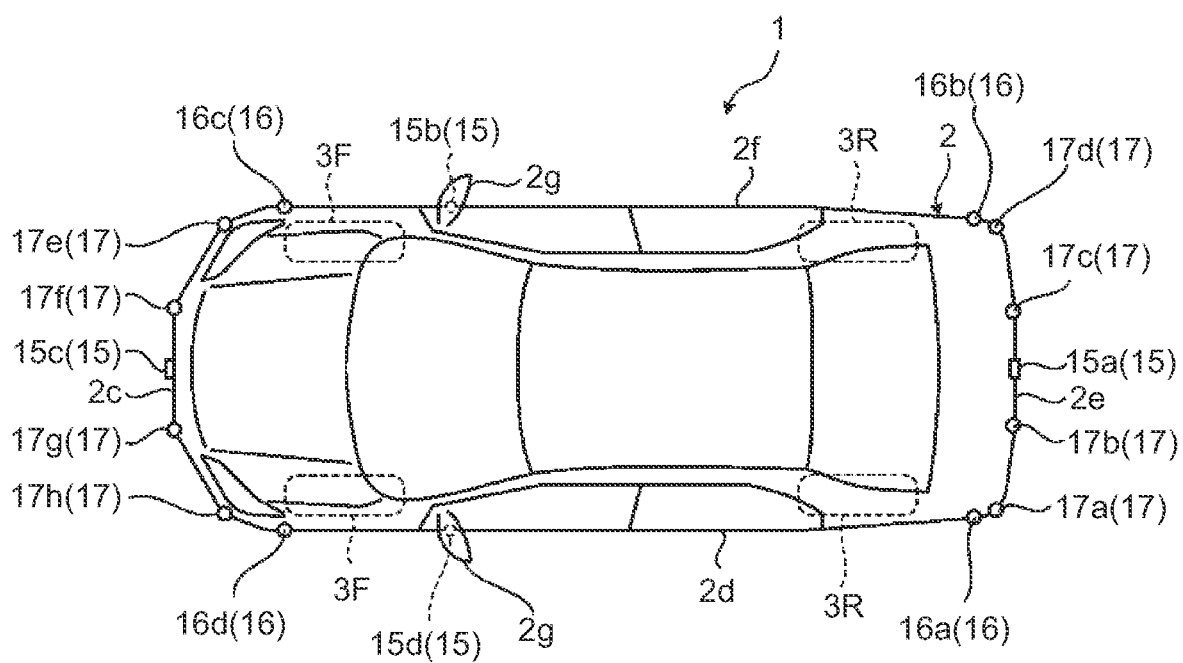
FIG. 2 is an illustrative and schematic view showing an external appearance of the vehicle according to the embodiment as seen from above.

As shown in FIG. 1 and FIG. 2, the vehicle 1 according to the embodiment is configured as a four-wheel automobile having two left and right front wheels 3F and two left and right rear wheels 3R. For simplicity's sake, the front wheels 3F and the rear wheels 3R may be hereinafter collectively referred to as wheels. In the embodiment, the angle of sideslip of some or all of the four wheels changes (these wheels turn) according to operation of a steering unit 303a etc.

The vehicle 1 is equipped with a plurality of (in the example shown in FIG. 1 and FIG. 2, four) on-board cameras 15a to 15d as imaging units for perimeter monitoring. The on-board camera 15a is provided at a rear end 2e of a vehicle body 2 (e.g., under a door 2h of a rear trunk) and images a region on a rear side of the vehicle 1. The on-board camera 15b is provided on a door mirror 2g at a right end 2f of the vehicle body 2 and images a region on a right side of the vehicle 1. The on-board camera 15c is provided at a front end 2c of the vehicle body 2 (e.g., on a front bumper) and images a region on a front side of the vehicle 1. The on-board camera 15d is provided on a door mirror 2g at a left end 2d of the vehicle body 2 and images a region on a left side of the vehicle 1. Hereinafter, the on-board cameras 15a to 15d may be referred to simply as on-board cameras 15 when it is not particularly necessary to distinguish them from one another.

Each on-board camera 15 is a so-called digital camera having an imaging device, for example, a charge-coupled device (CCD) or a CMOS (complementary metal-oxide semiconductor) image sensor (CIS). The on-board camera 15 images the surroundings of the vehicle 1 at a predetermined frame rate and outputs image data of captured images obtained by imaging. The image data obtained by the on-board camera 15 can also constitute a moving image as a frame image.

The vehicle body 2 is provided with distance measurement units 16, 17 that can be used as distance measurement sensors for detecting the distance to an object, such as a person or a thing (including the road), present around the vehicle 1. The distance measurement units 16, 17 are configured as sonars or laser radars that detect the distance to an object based on transmission and reception of waves. In the example shown in FIG. 2, the distance measurement unit 16 is composed of four distance measurement parts 16a to 16d, and the distance measurement unit 17 is composed of eight distance measurement parts 17a to 17h.

The distance measurement unit 16 is provided so as to detect an object on lateral sides of the vehicle 1, and the distance measurement unit 17 is provided so as to detect an object on the front side and the rear side of the vehicle 1. Further, the distance measurement unit 16 is configured, for example, to detect an object at a position relatively far away from the vehicle 1, and the distance measurement unit 17 is configured, for example, to detect an object located at a relatively short distance from the vehicle 1.

Next, a system configuration provided to realize various modes of control in the vehicle 1 according to the embodiment will be described using FIG. 3. The system configuration shown in FIG. 3 is merely one example and therefore can be changed in various ways.

Figure 3:
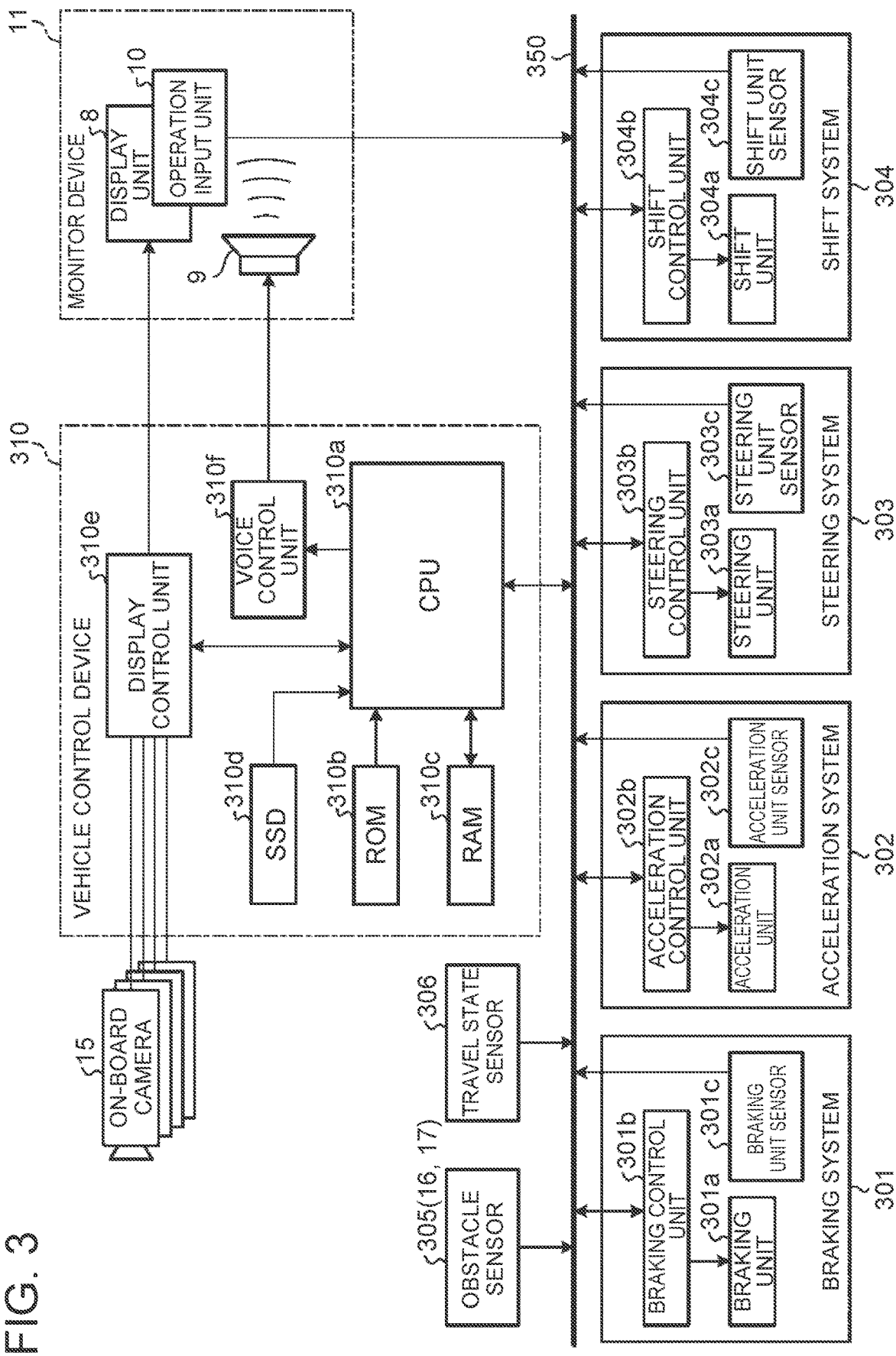
FIG. 3 is an illustrative and schematic block diagram showing the system configuration of the vehicle according to the embodiment.

FIG. 3 is an illustrative and schematic block diagram showing the system configuration of the vehicle 1 according to the embodiment.

As shown in FIG. 3, the vehicle 1 according to the embodiment has a braking system 301, an acceleration system 302, a steering system 303, a shift system 304, obstacle sensors 305, travel state sensors 306, the on-board cameras 15, the monitor device 11, a vehicle control device 310, and an on-board network 350.

The braking system 301 controls deceleration of the vehicle 1. The braking system 301 has a braking unit 301a, a braking control unit 301b, and a braking unit sensor 301c.

The braking unit 301a is, for example, an actuator that drives the braking mechanism of the vehicle 1. The braking unit 301a may operate so as to assist an operation performed on the braking operation unit 4 or may operate independently of an operation performed on the braking operation unit 4.

The braking control unit 301b is configured as, for example, a microcomputer having a hardware processor, such as a central processing unit (CPU). The braking control unit 301b controls a degree of deceleration of the vehicle 1 by, for example, activating the braking unit 301a based on a command input via the on-board network 350.

The braking unit sensor 301c is a sensing device that detects a state of the braking unit 301a (and the braking operation unit 4). A detection result of the braking unit sensor 301c is output to the on-board network 350 and used in devices on the on-board network 350.

The acceleration system 302 controls acceleration of the vehicle 1. The acceleration system 302 has an acceleration unit 302a, an acceleration control unit 302b, and an acceleration unit sensor 302c.

The acceleration unit 302a is, for example, an actuator that drives the acceleration mechanism of the vehicle 1. The acceleration unit 302a may operate so as to assist an operation performed on the acceleration operation unit 5 or may operate independently of an operation performed on the acceleration operation unit 5.

The acceleration control unit 302b is configured as, for example, a microcomputer having a hardware processor, such as a CPU. The acceleration control unit 302b controls a degree of acceleration of the vehicle 1 by, for example, activating the acceleration unit 302a based on a command input via the on-board network 350.

The acceleration unit sensor 302c is a sensing device that detects a state of the acceleration unit 302a (and the acceleration operation unit 5). A detection result of the acceleration unit sensor 302c is output to the on-board network 350 and used in devices on the on-board network 350.

The steering system 303 controls an advancing direction of the vehicle 1. The steering system 303 has the steering unit 303a, a steering control unit 303b, and a steering unit sensor 303c.

The steering unit 303a is, for example, an actuator that drives the steering mechanism of the vehicle 1. The steering unit 303a may operate so as to assist an operation performed on the steering operation unit 6 or may operate independently of an operation performed on the steering operation unit 6.

The steering control unit 303b is configured as, for example, a microcomputer having a hardware processor, such as a CPU. The steering control unit 303b controls the advancing direction of the vehicle 1 by, for example, activating the steering unit 303a based on a command input via the on-board network 350.

The steering unit sensor 303c is a sensing device that detects a state of the steering unit 303a (and the steering operation unit 6). A detection result of the steering unit sensor 303c is output to the on-board network 350 and used in devices on the on-board network 350.

The shift system 304 controls the gear ratio of the vehicle 1. The shift system 304 has a shift unit 304a, a shift control unit 304b, and a shift unit sensor 304c.

The shift unit 304a is, for example, an actuator that drives the shift mechanism of the vehicle 1. The shift unit 304a may operate so as to assist an operation performed on the shift operation unit 7 or may operate independently of an operation performed on the shift operation unit 7.

The shift control unit 304b is configured as, for example, a computer having a hardware processor, such as a CPU. The shift control unit 304b controls the gear ratio of the vehicle 1 by, for example, activating the shift unit 304a based on a command input via the on-board network 350.

The shift unit sensor 304c is a sensing device that detects a state of the shift unit 304a (and the shift operation unit 7). A detection result of the shift unit sensor 304c is output to the on-board network 350 and can be used in devices on the on-board network 350.

The obstacle sensors 305 are sensing devices that detect data on objects (obstacles) that can be present around the vehicle 1. The obstacle sensors 305 include the distance measurement units 16, 17 as the distance measurement sensors that acquire the distance to an object present around the vehicle 1. The obstacle sensors 305 may include the on-board cameras 15 that acquire an environment surrounding the vehicle 1 as images. Detection results of the obstacle sensors 305 are output to the on-board network 350 and can be used in devices on the on-board network 350.

The travel state sensors 306 are devices that detect a travel state of the vehicle 1. The travel state sensors 306 include, for example, a wheel speed sensor that detects a wheel speed of the vehicle 1, an acceleration sensor that detects a rate of acceleration in a front-rear direction or a left-right direction of the vehicle 1, and a gyro sensor that detects a turning speed (angular speed) of the vehicle 1. Detection results of the travel state sensors 306 are output to the on-board network 350 and can be used in devices on the on-board network 350.

The vehicle control device 310 is configured as, for example, an electronic control unit (ECU) that realizes various functions by comprehensively controlling various systems provided in the vehicle 1. As will be described in detail later, the vehicle control device 310 according to the embodiment is configured to be able to execute a parking assistance process for assisting parking (e.g., parallel parking) of the vehicle 1 into a parking space through autonomous driving, semi-autonomous driving, etc.

The vehicle control device 310 has a CPU 310*a*, a read-only memory (ROM) 310*b*, a random-access memory (RAM) 310*c*, a solid-state drive (SSD) 310*d*, a display control unit 310*e*, and a voice control unit 310*f*.

The CPU 310*a* is a hardware processor that comprehensively controls the vehicle control device 310. The CPU 310*a* reads various control programs (computer programs) stored in the ROM 310*b* etc. and realizes various functions in accordance with instructions specified in these various control programs. The control programs mentioned here include a parking assistance program for executing the aforementioned parking assistance process.

The ROM 310*b* is a non-volatile main storage device that stores parameters etc. required to execute the various control programs.

The RAM 310*c* is a volatile main storage device that provides a work area for the CPU 310*a*.

The SSD 310*d* is a rewritable non-volatile auxiliary storage device. In the vehicle control device 310 according to the embodiment, instead of the SSD 310*d* (or in addition to the SSD 310*d*), a hard disc drive (HDD) may be provided as an auxiliary storage device.

Of the various processes that can be executed in the vehicle control device 310, the display control unit 310*e* is mainly responsible for image processing of captured images acquired from the on-board cameras 15 and for creation of image data to be output to the display unit 8 of the monitor device 11.

Of the various processes that can be executed in the vehicle control device 310, the voice control unit 310*f* is mainly responsible for creation of voice data to be output to the voice output unit 9 of the monitor device 11.

The on-board network 350 communicably connects the braking system 301, the acceleration system 302, the steering system 303, the shift system 304, the obstacle sensors 305, the travel state sensors 306, the operation input unit 10 of the monitor device 11, and the vehicle control device 310 to one another.

Here, technologies concerning a parking assistance process for assisting parking the vehicle 1 into a parking space through autonomous driving, semi-autonomous driving, etc. have been hitherto explored. To ease a sense of fear etc. caused to the driver, such technologies are desired to execute the parking assistance process while securing a clearance (extra space) at a minimum between the vehicle 1 and an object around the parking space.

Figure 4:
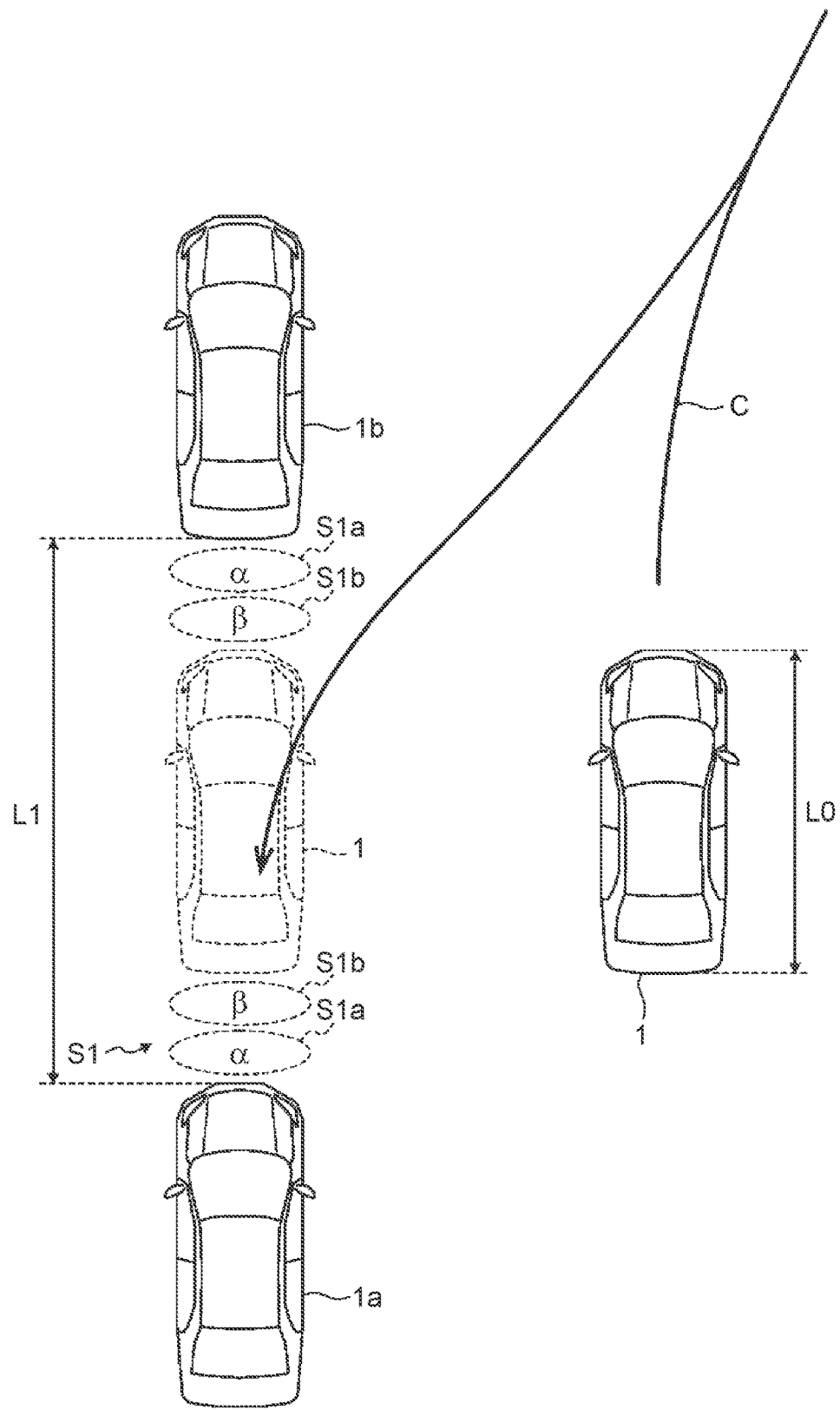
FIG. 4 is an illustrative and schematic view showing one example of a parking assistance process that can be executed in the embodiment.

For example, FIG. 4 is an illustrative and schematic view showing one example of the parking assistance process that can be executed in the embodiment.

In the example shown in FIG. 4, a space S1 with a length L1 provided between other vehicles 1*a*, 1*b* corresponds to a parking space. The vehicle 1 executes parallel parking by moving toward the space S1 as the parking space along a moving path indicated by arrow C.

Such parallel parking is usually executed when the length L1 of the space S1 is longer than a length L0 of the vehicle 1 by not less than a certain length. Therefore, when parallel parking into the space S1 is completed, a space S1*a* with a length $\alpha$ is secured as an extra space between the other vehicle 1*a* and the vehicle 1 and between the other vehicle 1*b* and the vehicle 1. In this case, other than the space S1*a* with the length $\alpha$, a space S1*b* with a length $\beta$ for absorbing errors in moving the vehicle 1 in the parking assistance process is secured between the other vehicle 1*a* and the vehicle 1 and between the other vehicle 1*b* and the vehicle 1.

Conventionally, the length $\alpha$ of the space S1*a* as an extra space to be secured at a minimum (also the length $\beta$ of the space S1*b*) has been determined in advance as a fixed value according to the specifications of the vehicle 1 etc. (the length of the vehicle 1, the response performance of the braking unit 301*a* and the acceleration unit 302*a*, etc.).

However, if the size of the extra space to be secured at a minimum is always set to a fixed value, depending on the size of the parking space (and the size of the vehicle 1), moving the vehicle 1 so as not to enter the extra space may become difficult to achieve and thus appropriate assistance in parking the vehicle 1 may fail. It is therefore desirable to appropriately provide assistance in parking the vehicle 1 while changing, as necessary, the size of the extra space to be secured at a minimum.

Figure 5:
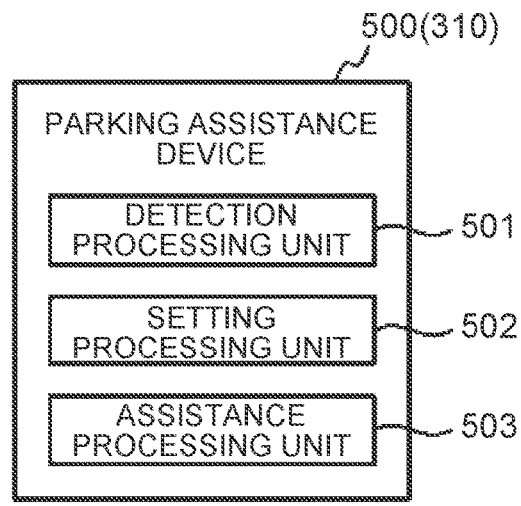
FIG. 5 is an illustrative and schematic block diagram showing the functions of a parking assistance device according to the embodiment.

In the embodiment, a parking assistance device 500 having the functions as shown in FIG. 5 to be referred to next is realized by the vehicle control device 310 to thereby appropriately provide assistance in parking the vehicle 1 while changing, as necessary, the size of the extra space to be secured at a minimum.

FIG. 5 is an illustrative and schematic block diagram showing the functions of the parking assistance device 500 according to the embodiment.

The functions shown in FIG. 5 are realized inside the vehicle control device 310 through cooperation between software and hardware. Specifically, the functions shown in FIG. 5 are realized as a result of the CPU 310*a* of the vehicle control device 310 reading and executing the parking assistance program that is a control program stored in the ROM 310*b* etc. Alternatively, in the embodiment, at least some of the functions shown in FIG. 5 may be realized as dedicated hardware (circuitry).

As shown in FIG. 5, the parking assistance device 500 according to the embodiment includes a detection processing unit 501, a setting processing unit 502, and an assistance processing unit 503.

The detection processing unit 501 detects the size of a parking space into which the vehicle 1 is likely to be parked based on detection results of the obstacle sensors 305. For example, in the above-described example shown in FIG. 4, the detection processing unit 501 detects the length L1 of the space S1 between the other vehicles 1*a*, 1*b* as the size of the parking space.

Then, the setting processing unit 502 sets the size of the extra space to be secured at a minimum between the vehicle 1 and an object around the parking space while changing that size according to the size of the parking space detected by the detection processing unit 501.

For example, when the parking space is large, moving the vehicle 1 so as not to enter the extra space is easy to achieve, even when the size of the extra space is set to a fixed value, as in the conventional process, that is determined in advance according to the specifications of the vehicle 1 etc. to mitigate a sense of fear caused to the driver.

On the other hand, when the size of the parking space is small, if the size of the extra space is set to a fixed value according to the specifications of the vehicle 1 etc. as in the conventional process, moving the vehicle 1 so as not to enter the extra space becomes difficult to achieve. However, also in this case, it is possible to move the vehicle 1 so as not to enter the extra space by setting the size of the extra space to be smaller than the normal size while tolerating to some extent the sense of fear caused to the driver.

Therefore, the setting processing unit 502 sets the size of the extra space to a first size when the size of the parking space is equal to or larger than a first threshold value, and sets the size of the extra space to a second size that is smaller than the first size when the size of the parking space is equal to or smaller than a second threshold value that is smaller than the first threshold value.

In the embodiment, since the detection results of the obstacle sensors 305 can include errors, the detection result of the size of the parking space can change with the movement of the vehicle 1. Therefore, instead of ending the detection of the size of the parking space after the first time, the detection processing unit 501 repeatedly executes the detection of the size of the parking space until parking of the vehicle 1 into the parking space is completed. Further, the setting processing unit 502 repeatedly executes the setting of the size of the extra space to the first size or the second size according to the size of the parking space until parking of the vehicle 1 into the parked space is completed.

However, it is not desirable that the size of the extra space changes frequently between the first size and the second size. Therefore, when the size of the parking space is between the first threshold value and the second threshold value, the setting processing unit 502 sets the size of the extra space to one of the first size and the second size to which the size has been previously set. When setting the size of the extra space for the first time, the setting processing unit 502 sets the size of the extra space to one of the first size and the second size that is determined as a default value in advance.

The assistance processing unit 503 provides assistance in parking the vehicle 1 into the parking space based on the size of the extra space set by the setting processing unit 502. More specifically, the assistance processing unit 503 calculates a travel path to be taken by the vehicle 1 to reach the parking space based on the size of the extra space set by the setting processing unit 502, and executes the parking assistance process that includes controlling one or more of the braking system 301, the acceleration system 302, the steering system 303, and the shift system 304 such that the vehicle 1 moves along the travel path.

In the embodiment, parameters other than the size of the extra space can also be subject to setting (change) according to the size of the parking space.

For example, in the embodiment, when the size of the parking space is large, moving the vehicle 1 so as not to enter the extra space is easy to achieve, even when a maximum strength with which the assistance processing unit 503 is permitted to control braking of the vehicle 1 is set to be low enough to be able to sufficiently mitigate deterioration of the ride comfort due to braking shock.

On the other hand, when the size of the parking space is small, if the maximum strength of braking of the vehicle 1 is set to be low as in the above case, the braking distance is likely to become longer and thus moving the vehicle 1 so as not to enter the extra space becomes difficult to achieve. However, also in this case, it is possible to move the vehicle 1 so as not to enter the extra space by setting the maximum strength of braking of the vehicle 1 to be high while tolerating to some extent deterioration of the ride comfort due to braking shock.

In the embodiment, therefore, the setting processing unit 502 can also set the maximum strength of braking of the vehicle 1 to be permitted for the assistance processing unit 503 while changing the maximum strength according to the size of the parking space. More specifically, the setting processing unit 502 can set the maximum strength of braking of the vehicle 1 to a first strength when the size of the parking space is equal to or larger than the first threshold value, and set the maximum strength of braking of the vehicle 1 to a second strength that is higher than the first strength when the size of the parking space is equal to or smaller than the second threshold value that is smaller than the first threshold value.

Further, in the embodiment, when the size of the parking space is large, moving the vehicle 1 so as not to enter the extra space is easy to achieve, even when the timing of starting the vehicle 1 having been stopped that is controlled by the assistance processing unit 503 is set to be early enough to be able to sufficiently mitigate deterioration of the ride comfort due to a delay in starting.

On the other hand, when the size of the parking space is small, if the timing of starting the vehicle 1 that is controlled by the assistance processing unit 503 is set to be early as in the above case, the vehicle 1 is likely to start suddenly and thus moving the vehicle 1 so as not to enter the extra space becomes difficult to achieve. However, also in this case, it is possible to move the vehicle 1 so as not to enter the extra space by setting the timing of starting the vehicle 1 to be late while tolerating to some extent deterioration of the ride comfort due to a delay in starting.

In the embodiment, therefore, the setting processing unit 502 can also set the timing of starting the vehicle 1 that is controlled by the assistance processing unit 503 while changing the timing according to the size of the parking space. More specifically, the setting processing unit 502 can set the timing of starting the vehicle 1 to a first timing when the size of the parking space is equal to or larger than the first threshold value, and set the timing of starting the vehicle 1 to a second timing that is later than the first timing when the size of the parking space is equal to or smaller than the second threshold value that is smaller than the first threshold value.

When the size of the parking space is between the first threshold value and the second threshold value, both the maximum strength of braking of the vehicle 1 and the timing of starting the vehicle 1 can be set based on the same idea as in the above-described example in which the length of the extra space is set according to the size of the parking space. That is, when the size of the parking space is between the first threshold value and the second threshold value, the maximum strength of braking of the vehicle 1 can be set to one of the first strength and the second strength to which the maximum strength has been previously set, and the timing of starting the vehicle 1 can be set to one of the first timing and the second timing to which the timing has been previously set.

Figure 6:
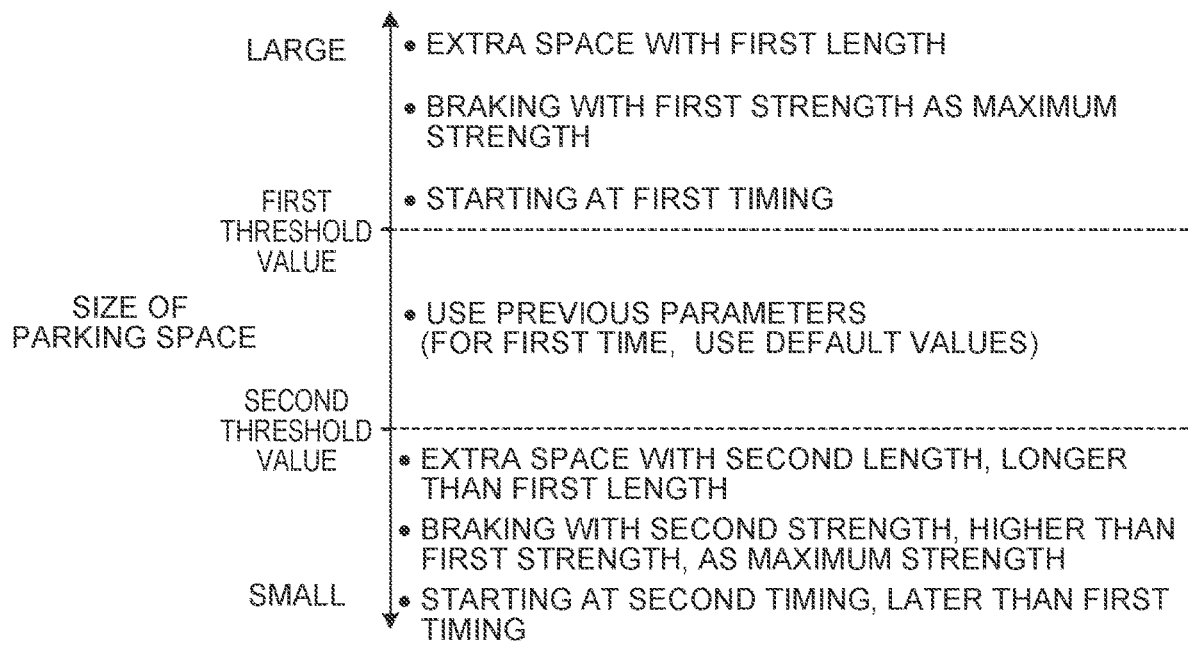
FIG. 6 is an illustrative and schematic view for describing control according to the size of a parking space that can be executed in the embodiment.

To sum up, the control executed in the embodiment according to the size of the parking space is as shown in FIG. 6 to be referred to next.

FIG. 6 is an illustrative and schematic view for describing the control according to the size of the parking space that can be executed in the embodiment.

As shown in FIG. 6, the control is executed in the embodiment such that, when the size of the parking space detected by the detection processing unit 501 is equal to or larger than the first threshold value, the extra space with the first length, braking with the first strength as the maximum strength, and starting at the first timing are realized.

Further, the control is executed in the embodiment such that, when the size of the parking space is equal to or smaller than the second threshold value that is smaller than the first threshold value, the extra space with the second length that is shorter than the first length, braking with the second strength that is higher than the first strength as the maximum strength, and starting at the second timing that is later than the first timing are realized.

Furthermore, in the embodiment, when the size of the parking space is between the first threshold value and the second threshold value, if the previous parameters are the first length, the first strength, and the first timing, these parameters are continuously used, and if the previous parameters are the second length, the second strength, and the second timing, these parameters are continuously used. As for the first time in which there are no previous parameters, one of the combination of the first length, the first strength, and the first timing and the combination of the second length, the second strength, and the second timing that is determined as default values in advance is used.

Based on the configuration having been described above, the parking assistance device 500 according to the embodiment executes, as the parking assistance process, the sequence of processes as shown in FIG. 7 to be referred to next. The sequence of processes shown in FIG. 7 is started, for example, when the size of a parking space detected by the detection processing unit 501 is equal to or larger than a predetermined size.

FIG. 7 is an illustrative flowchart showing the sequence of processes that the parking assistance device 500 according to the embodiment executes as the parking assistance process.

As shown in FIG. 7, in the embodiment, the detection processing unit 501 of the parking assistance device 500 first acquires detection results of the obstacle sensors 305 in S701.

In S702, based on the information acquired in S701, the detection processing unit 501 detects the size (e.g., the length) of the parking space into which the vehicle 1 is likely to be parked.

In S703, the setting processing unit 502 of the parking assistance device 500 determines how small the parking space is based on the detection result of S702. More specifically, when the size of the parking space is equal to or larger than the above-described first threshold value, the setting processing unit 502 determines that the parking space is large, and when the size of the parking space is equal to or smaller than the above-described second threshold value, the setting processing unit 502 determines that the parking space is small. Further, when the size of the parking space is between the first threshold value and the second threshold value, the setting processing unit 502 retains the determination result of S703 previously executed. However, when the process of S703 is executed for the first time, the setting processing unit 502 determines, for example, that the parking space is small in accordance with a setting determined in advance.

In S704, the setting processing unit 502 determines whether it is determined in S703 that the size of the parking space is small.

When it is determined in S704 that the size of the parking space is small, the process moves to S705. In S705, the setting processing unit 502 sets the length of the extra space to be taken into account in the parking assistance process to the second length, shorter than the first length that is the normal length determined in advance according to the specifications of the vehicle 1 etc. to mitigate a sense of fear caused to the driver.

In S706, the setting processing unit 502 sets the maximum strength of braking to be permitted for the assistance processing unit 503 in the parking assistance process to the second strength, higher than the first strength that is the normal strength set such that deterioration of the ride comfort due to braking shock can be sufficiently mitigated.

In S707, the setting processing unit 502 sets the timing of starting the vehicle 1 having been stopped that is controlled by the assistance processing unit 503 in the parking assistance process to the second timing, later than the first timing that is the normal timing set such that deterioration of the ride comfort due to a delay in starting can be sufficiently mitigated.

Meanwhile, when it is determined in S704 that the size of the parking space is large, the process moves to S708. In S708, the setting processing unit 502 sets the length of the extra space to be taken into account in the parking assistance process to the normal first length.

In S709, the setting processing unit 502 sets the maximum strength of braking to be permitted for the assistance processing unit 503 in the parking assistance process to the normal first strength.

In S710, the setting processing unit 502 sets the timing of starting the vehicle 1 having been stopped that is controlled by the assistance processing unit 503 in the parking assistance process to the normal first timing.

When setting of the parameters to be taken into account in the parking assistance process has been completed by the processes of S705 to S707 or the processes of S708 to S710, the process moves to S711. In S711, the assistance processing unit 503 creates a moving path of the vehicle 1 to the parking space based on the length (the first length or the second length) of the extra space.

In S712, the assistance processing unit 503 moves the vehicle 1 along the moving path created in S711 by controlling one or more of the braking system 301, the acceleration system 302, the steering system 303, and the shift system 304, with the maximum strength (the first strength or the second strength) of braking and the timing (the first timing or the second timing) of starting taken into account.

In S713, the assistance processing unit 503 determines whether parking of the vehicle 1 into the parking space has been completed.

When it is determined in S713 that parking has not been completed, the process returns to S701. When it is determined in S713 that parking has been completed, the process ends. In this way, the parking assistance process according to the embodiment is executed.

As has been described above, the parking assistance device 500 according to the embodiment includes the detection processing unit 501, the setting processing unit 502, and the assistance processing unit 503. The detection processing unit 501 detects the size (length) of a parking space into which the vehicle 1 is likely to be parked. The setting processing unit 502 sets the size (length) of an extra space to be secured at a minimum between the vehicle 1 and an object around the parking space while changing that size according to the size of the parking space detected by the detection processing unit 501. The assistance processing unit 503 provides assistance in parking the vehicle 1 into the parking space based on the size of the extra space set by the setting processing unit 502.

The parking assistance device 500 according to the embodiment can appropriately provide assistance in parking the vehicle 1 while changing, as necessary, the size of the extra space to be secured at a minimum according to the size of the parking space.

More specifically, in the embodiment, the setting processing unit 502 sets the size of the extra space to the first size (first length) when the size of the parking space is equal to or larger than the first threshold value, and sets the size of the extra space to the second size (second length) that is smaller than the first size when the size of the parking space is equal to or smaller than the second threshold value that is smaller than the first threshold value. This configuration makes it possible to easily set the size of the extra space to either the first size or the second size by comparing the size of the parking space with the first threshold value and the second threshold value.

In the embodiment, the detection processing unit 501 repeatedly executes the detection of the size of the parking space until parking of the vehicle 1 into the parking space is completed. Further, the setting processing unit 502 repeatedly executes the setting of the size of the extra space to the first size or the second size according to the size of the parking space until parking of the vehicle 1 into the parking space is completed. This configuration makes it possible to appropriately update the size of the extra space according to the latest detection result of the size of the parking space.

In the embodiment, the setting processing unit 502 sets the size of the extra space to one of the first size and the second size to which the size has been previously set, when the size of the parking space is between the first threshold value and the second threshold value. This configuration makes it possible to avoid frequent switching of the size of the extra space between the first size and the second size by taking a history of the previous setting into account.

In the embodiment, the assistance processing unit 503 can provide assistance in parking the vehicle 1 that includes controlling braking of the vehicle 1. In this case, the setting processing unit 502 can set the maximum strength of braking of the vehicle 1 to be permitted for the assistance processing unit 503 while changing the maximum strength according to the size of the parking space. This configuration makes it possible to easily move the vehicle 1 according to the size of the parking space so as not to enter the extra space by changing the maximum strength of braking of the vehicle 1 as necessary.

More specifically, in the embodiment, the setting processing unit 502 can set the maximum strength of braking of the vehicle 1 to the first strength when the size of the parking space is equal to or larger than the first threshold value, and set the maximum strength of braking of the vehicle 1 to the second strength that is higher than the first strength when the size of the parking space is equal to or smaller than the second threshold value that is smaller than the first threshold value. This configuration makes it possible to easily set the maximum strength of braking to either the first strength or the second strength by comparing the size of the parking space with the first threshold value and the second threshold value.

In the embodiment, the assistance processing unit 503 can provide assistance in parking the vehicle 1 that includes controlling the timing of starting the vehicle 1 having been stopped. In this case, the setting processing unit 502 can further set the timing of starting the vehicle 1 to be controlled by the assistance processing unit 503 while changing the timing according to the size of the parking space. This configuration makes it possible to easily move the vehicle 1 according to the size of the parking space so as not to enter the extra space by changing the timing of starting the vehicle 1 as necessary.

More specifically, in the embodiment, the setting processing unit 502 sets the timing of starting the vehicle 1 to the first timing when the size of the parking space is equal to or larger than the first threshold value, and sets the timing of starting the vehicle 1 to the second timing that is later than the first timing when the size of the parking space is equal to or smaller than the second threshold value that is smaller than the first threshold value. This configuration makes it possible to easily set the timing of starting the vehicle 1 to either the first timing or the second timing by comparing the size of the parking space with the first threshold value and the second threshold value.

The parking assistance program executed in the vehicle control device 310 according to the embodiment need not be necessarily stored in the ROM 310*b* etc. in advance. For example, the parking assistance program according to the embodiment may be provided as a computer program product that is recorded in a computer-readable recording medium, such as a magnetic disc or an optical disc, in an installable or executable format.

Further, the parking assistance program according to the embodiment may be provided or distributed via a network, such as the Internet. That is, the parking assistance program according to the embodiment may be provided by being downloaded via a network, such as the Internet, in a state of being stored in a computer connected to the network.

Modified Examples

In the above-described embodiment, the configuration in which the length of the extra space is changed according to the size of the parking space during execution of the parking assistance process for parallel parking has been illustrated. However, changing the length of the extra space according to the size of the parking space is also effective during execution of a parking assistance process for parking other than parallel parking, for example, perpendicular parking. Further, changing the length of the extra space according to the size of the parking space can also be effective during execution of a travel assistance process other than a parking assistance process, for example, a pull-out assistance process for assisting the vehicle 1 in pulling out of a parking space.

In the above-described embodiment, the configuration in which each of the length of the extra space, the maximum strength of braking, and the timing of starting is changed between two levels has been illustrated. However, the length of the extra space, the maximum strength of braking, and the timing of starting may be changed among three or more levels or changed continuously without involving levels.

While the embodiment and the modified examples of this disclosure have been described above, the embodiment and the modified examples described above are merely examples and not intended to limit the scope of the disclosure. The novel embodiment and the modified examples thereof described above can be implemented in many different forms, and various omissions, substitutions, and changes can be made thereto within a range that does not depart from the gist of the disclosure. The embodiment and the modified examples described above are included in the scope and gist of the disclosure as well as in the disclosure described in the scope of claims and an equivalent scope.

What is claimed is:

1. A parking assistance device comprising a central processing unit configured to:
- detect a size of a parking space into which a vehicle is likely to be parked;
- set a size of an extra space to be secured at a minimum between the vehicle and an object around the parking space while changing that size according to the detected size of the parking space; and
- provide assistance in parking the vehicle into the parking space based on the set size of the extra space by autonomously controlling at least one of braking, acceleration, steering or shifting of the vehicle,
- wherein the central processing unit is configured to set the size of the extra space to a first size when the size of the parking space is equal to or larger than a first threshold value, and to set the size of the extra space to a second size that is smaller than the first size when the size of the parking space is equal to or smaller than a second threshold value that is smaller than the first threshold value,
- wherein the size of the extra space is set in a same direction to the first size and the second size.

2. The parking assistance device according to claim 1, wherein:
- the central processing unit is configured to repeatedly execute detection of the size of the parking space until parking of the vehicle into the parking space is completed; and
- the central processing unit is configured to repeatedly execute setting of the size of the extra space to the first size or the second size according to the size of the parking space until parking of the vehicle into the parking space is completed.

3. The parking assistance device according to claim 2, wherein the central processing unit is configured to set the size of the extra space to one of the first size and the second size to which the size has been previously set, when the size of the parking space is between the first threshold value and the second threshold value.

4. The parking assistance device according to claim 1, wherein:
- the central processing unit is configured to provide assistance in parking the vehicle that includes controlling braking of the vehicle; and
- the central processing unit is configured to set a maximum strength to be permitted of braking of the vehicle while changing the maximum strength according to the size of the parking space.

5. The parking assistance device according to claim 4, wherein the central processing unit is configured to set the maximum strength of braking of the vehicle to a first strength when the size of the parking space is equal to or larger than a first threshold value, and to set the maximum strength of braking of the vehicle to a second strength that is higher than the first strength when the size of the parking space is equal to or smaller than a second threshold value that is smaller than the first threshold value.

6. The parking assistance device according to claim 1, wherein:
- the central processing unit is configured to provide assistance in parking the vehicle that includes controlling a timing of starting the vehicle having been stopped; and
- the central processing unit is configured to set the timing of starting the vehicle to be controlled while changing the timing according to the size of the parking space.

7. The parking assistance device according to claim 6, wherein the central processing unit is configured to set the timing of starting the vehicle to a first timing when the size of the parking space is equal to or larger than a first threshold value, and to set the timing of starting the vehicle to a second timing that is later than the first timing when the size of the parking space is equal to or smaller than a second threshold value that is smaller than the first threshold value.

* * * * *